US012787972B1

(12) United States Patent
Cuevas et al.

(10) Patent No.: US 12,787,972 B1
(45) Date of Patent: Nov. 10, 2026

(54) AUTOMATED SOLID/LIQUID DISPENSER

(71) Applicants: Clarissa Alison Cuevas, El Segundo, CA (US); Carlos Cuevas, El Segundo, CA (US)

(72) Inventors: Clarissa Alison Cuevas, El Segundo, CA (US); Carlos Cuevas, El Segundo, CA (US)

( * ) Notice: Subject to any disclaimer, the term of this patent is extended or adjusted under 35 U.S.C. 154(b) by 0 days.

(21) Appl. No.: 19/639,804

(22) Filed: Apr. 6, 2026

Related U.S. Application Data

(63) Continuation-in-part of application No. 19/301,596, filed on Aug. 15, 2025.

(51) Int. Cl.
*B08B 9/08* (2006.01)
*A01K 5/02* (2006.01)
*A01K 7/02* (2006.01)

(52) U.S. Cl.
CPC ............ *A01K 5/0291* (2013.01); *A01K 7/027* (2013.01)

(58) Field of Classification Search
CPC .............................. A01K 5/0291; A01K 7/027
See application file for complete search history.

(56) References Cited

U.S. PATENT DOCUMENTS 3,780,702 A * 12/1973 Waterbury ............... A01K 5/02 119/51.13
4,427,456 A * 1/1984 Rowan .................. B08B 9/0861 134/25.4
4,456,022 A * 6/1984 Roberts ................. A47L 15/502 134/99.1
5,129,361 A * 7/1992 Deutsch ............... A01K 5/0291 119/51.5
5,588,394 A * 12/1996 Balistreri ............. A01K 5/0275 119/51.5
6,766,766 B1 * 7/2004 Elliott .................. A01K 5/0291 119/57.92
2012/0060761 A1 * 3/2012 Laro ........................ A01K 5/02 340/392.1
2014/0190519 A1 * 7/2014 Simundic ................. A61G 9/02 134/57 R
2015/0053138 A1 * 2/2015 Ramsey ............... A01K 5/0291 119/61.5

(Continued)

FOREIGN PATENT DOCUMENTS

CN 2406481 * 11/2000
CN 111715641 * 9/2020 ............... B08B 9/34

(Continued)

*Primary Examiner* — Bob Zadeh
(74) *Attorney, Agent, or Firm* — ALONZO & ASSOCIATES; Arlyn Alonzo

(57) ABSTRACT

Aspects of the disclosure are directed to an automated solid/liquid dispenser In accordance with one aspect, the disclosure includes a housing including a hinge, a trash area and at least one compartment for holding content; a bowl for receiving the content; a lifting floor plate coupled to the hinge, wherein the bowl sits on top of the lifting floor plate; a water hose connected through a hole into the housing in a position to spray water onto the bowl when the bowl is placed in a tilted position by the lifting floor plate; and motor configured to lower at least one cleaning tool to an inner surface of the bowl to scrub the inner surface of the bowl as the bowl receives the spray water from the water hose.

18 Claims, 6 Drawing Sheets

(56) References Cited

U.S. PATENT DOCUMENTS

| | | | | |
|---|---|---|---|---|
| 2015/0181837 | A1 * | 7/2015 | Cornwell | G08C 17/02 119/51.02 |
| 2017/0099803 | A1 * | 4/2017 | Neighbors | A01K 5/0208 |
| 2024/0081283 | A1 * | 3/2024 | Franklin | A01K 5/0128 |
| 2025/0268228 | A1 * | 8/2025 | Kee | A01K 5/0114 |

FOREIGN PATENT DOCUMENTS

| | | | | | |
|---|---|---|---|---|---|
| JP | H06304018 | A | * | 11/1994 | |
| WO | WO-2025106809 | A2 | * | 5/2025 | A01K 5/025 |

* cited by examiner

AUTOMATED SOLID/LIQUID DISPENSER

This application is a Continuation-in-part of patent application Ser. No. 19/301,596 filed Aug. 15, 2025, the entire contents of the prior application are incorporated herein by reference as if fully set forth below in its entirety and for all applicable purposes.

TECHNICAL FIELD

This disclosure relates generally to the field of dispensers and, in particular, to an automated solid/liquid dispenser.

BACKGROUND

Pets such as dogs and cats are often treated as family members. But, there are occasions when pets are separated from their pet parents for a lengthy period of time. For example, a family may go on vacation in which pets may not accompany the human family. Some pet parents are away from home most of the day for work. For some, pet hotel or pet sitters are not economical, especially if the only need is to feed the pet periodically. Thus, having an automated pet food and liquid feeder allows for flexibility with pet care by providing the pet parent the freedom to be away from their pet for a longer period of time.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides an automated solid/liquid dispenser. Accordingly, the present disclosure discloses an apparatus including: a housing including a hinge, a trash area and at least one compartment for holding content; a bowl for receiving the content; and a lifting floor plate coupled to the hinge, wherein the bowl sits on top of the lifting floor plate, and wherein the lifting floor plate places the bowl in a tilted position towards the trash area.

In one aspect, the disclosure provides an apparatus including: a housing including a hinge, a trash area and at least one compartment for holding content; a bowl for receiving the content; a lifting floor plate coupled to the hinge, wherein the bowl sits on top of the lifting floor plate; a water hose connected through a hole into the housing in a position to spray water onto the bowl when the bowl is placed in a tilted position by the lifting floor plate; and motor configured to lower at least one cleaning tool to an inner surface of the bowl to scrub the inner surface of the bowl as the bowl receives the spray water from the water hose.

These and other aspects of the present disclosure will become more fully understood upon a review of the detailed description, which follows. Other aspects, features, and implementations of the present disclosure will become apparent to those of ordinary skill in the art, upon reviewing the following description of specific, exemplary implementations of the present invention in conjunction with the accompanying figures. While features of the present invention may be discussed relative to certain implementations and figures below, all implementations of the present invention can include one or more of the advantageous features discussed herein. In other words, while one or more implementations may be discussed as having certain advantageous features, one or more of such features may also be used in accordance with the various implementations of the invention discussed herein. In similar fashion, while exemplary implementations may be discussed below as device, system, or method implementations it should be understood that such exemplary implementations can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 1:
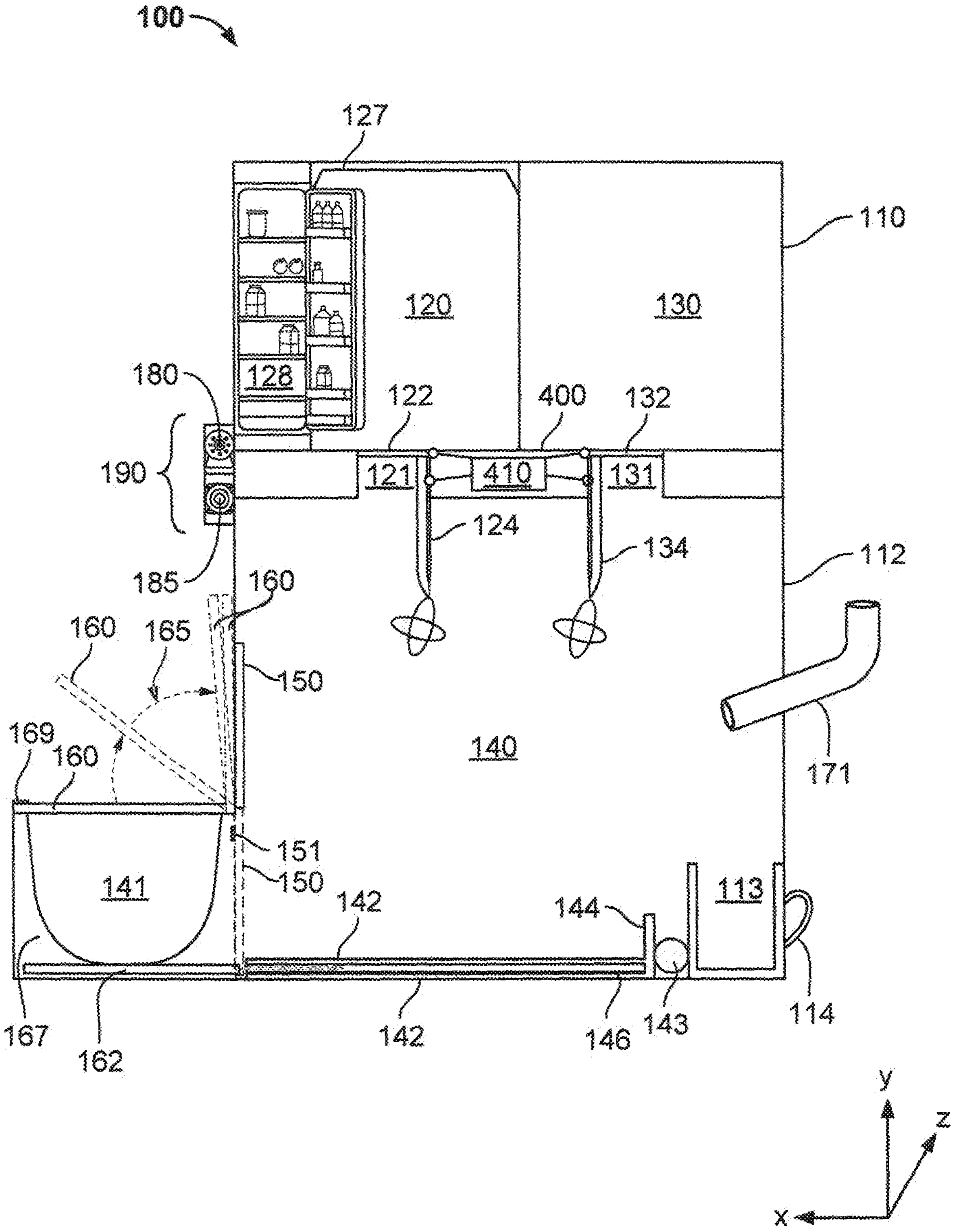
FIG. 1 illustrates an example automated solid/liquid dispenser.

FIG. 1 illustrates an example automated solid/liquid dispenser 100. In one example, the automated solid/liquid dispenser 100 includes a housing 110. Within the housing 110, there are at least two compartments: a solid compartment 120 to contain solids and a liquid compartment 130 to contain liquid. In one example, for each of the two compartments, each includes an opening 121, 131 with respective covers 122, 132. And, in each opening 121, 131, a respective mixer 124, 134, such as a spoon, is attached which can descend down to a bowl housing area 140. Although the at least two compartments are labeled as the solid compartment 120 and the liquid compartment 130, a user may decide to fill both compartments with either both solid contents or both liquid contents by choice. In one example, content is food (e.g., solid food or liquid food such as drinks). Content could also include medication (prescribed by a medical professional or over the counter medicine). One skilled in the art would understand that the term "content" could include any substance that could be fed to a person or a pet/an animal in captivity.

In one example, the solid compartment 120 may comprise a moveable lid 127 that pushes the contents downwards and retracts upwards. In one example, the moveable lid has two side portions that are angled to scrape the sides of the storage containers.

In one example, the solid compartment 120 may allow content that requires refrigeration. Thus, the solid compartment may include a refrigerator 128 to keep the solid content cool. In one example, the temperature of the refrigerator 128 may be adjusted by a processor of the automated solid/liquid dispenser 100. In one example, the refrigerator may also have a door opening that is accessible by a user that allows the user to store additional content as shown in FIG. 1. Note that as shown in FIG. 1, the user accessible door of the refrigerator 128 is open. Thus, the refrigerator 128 may have a dual purpose, to keep the content in the solid compartment 120 and/or the liquid compartment 130 cool and to allow extra storage cooling storage space. Additionally, one skilled in the art would understand that although the refrigerator 128 is disclosed as being adjacent to the solid compartment 120, it is within the spirit and scope of the present disclosure to have the refrigerator 128 be adjacent to the liquid compartment 130 or to have an additional refrigerator adjacent to the liquid compartment 130. And, in one example, the processor (not shown) may be programmed remotely (for example, via mobile app) by a user.

In one example embodiment, the refrigerator 128 is a separable unit. Although coupled physically to the housing 110, the refrigerator 128, functions independently (without providing cooling functions to the solid or liquid compartments 120, 130). That is, it's cooling storage space is confined to just itself and the content within the refrigerator 128.

In one example, the bowl housing area 140 includes a lifting floor plate 142 attached to a hinge wall 144 via a hinge 143 to allow the lifting floor plate 142 to lift a bowl 141 in the direction of the arrow 145. In one example, the hinge 143 is an elongated hinge along the z-axis. In one example, the lifting floor plate 142 is lifted to form an angle of approximately 25 to 60 degrees theta θ between the x-axis and the y-axis. See FIG. 3.

In one example, once the bowl 141 is filled with content from either or both of the solid compartment 120 and/or the liquid compartment 130, the bowl 141 may be moved from the bowl housing area 140 to the outer area 167. In one example, the hinge wall 144 moves along a hinge track 146 for the hinge wall 144 to push the bowl 141 along with the sliding floor plate 162 to take their place at the outer area 167 to allow access by, for example, a pet. In one example, the movement of the hinge wall 144 may be activated by a processor which may be programed by a user. In one example, the movement of the hinge wall 144 may be activated by another motion of another component of the automated solid/liquid dispenser.

Although not shown, in one example, the sliding floor plate 162, the lifting floor plate 142, and the hinge wall 144 are coordinated with each other by a pattern that allow the three to coordinate their movement along the hinge track 146. And, in one example, the bottom surface of the bowl 141 is also aligned with the pattern to allowed its movement between the outer area 167 and the bowl housing area 140.

In one example, a hinge motor 170 is housed below, next to or near the lifting floor plate 142 and is coupled to the hinge 143 to lift the lifting floor plate 142. For example, the hinge motor 170 may be activated by a weight sensor (not shown) coupled to a sliding floor plate 162 or may be manually activated by a user. In one example, the weight sensor weighs the content of the bowl 141 to determine the amount of content left in the bowl to determine if cleaning the bowl 141 is warranted. In one example, the amount of food a pet eats may be recorded by the weight sensor and an associated processor as a form of weight management. In one example, a non-transitory memory is included in the automated solid/liquid dispenser to store the amount of food intake consumed on a periodic basis (e.g., daily basis).

In another example, the hinge motor 170 may be programmed to automatically lift the bowl 141 on a timing schedule after the bowl 141 has sat on the sliding floor plate 162 after a pre-programed time duration wherein the bowl 141 is then transferred to the lifting floor plate 142 for the hinge motor 170 to be activated for lifting.

In one example, a door sensor 151 is coupled to a bowl housing door 150, In one example, the location of the door sensor 151 may vary from where it is shown in FIG. 1. As shown, the door sensor 151 senses the opening of the bowl housing door 150 which then triggers a timer 152 (not shown). The timer may measure the length of time the bowl 141 sits on the lifting floor plate 142 which may in turn trigger the hinge motor 170, in one example, to lift the bowl 141 via the hinge 143 for cleaning.

In one example, the bowl housing door 150 is lifted vertically upward into the wall 111 of the housing and tucked inside the wall 111 when the bowl housing door is in an open position. In one example, a motor that lifts the bowl housing door 150 vertically upward into the wall 111 may be the same motor that also operates covers 122, 132 and/or mixers 124, 134. Or, in another example, a separate motor (not shown) may be used solely for lifting the bowl housing door 150 vertically upward into the wall 111. And, the motor for lifting the bowl housing door 150 may be operated by a processor (not shown) that is housed within the housing 110.

In one example, the housing 110 includes a sliding floor plate 162. As shown in FIG. 1, the bowl 141 sits on the sliding floor plate 162. In one example, a lid 160 sits on top of the bowl 141. The lid 160 may be lifted in the direction of the arrow 165 to permit access to any content within the bowl 141. In one example, a top side of the lid 160 is fitted with an electromagnet such that when it rests against a side 111 with at least partial metal strips of the housing 110, the lid 160 can snug securely against the housing 110. In one example, when it is time to close the lid, the electromagnetic field is deactivated. In one example, the lid 160 is coupled to a motion sensor 169 wherein if a pet approaches the proximity of the lid 160, the motion sensor 169 may activate the lid 160 to open. However, in one example, the opening of the lid 160 by the motion sensor 169 may be voided by a human user if warranted.

In one example, the lid 160 may be opened or closed in accordance with a timing schedule that may be programed by a user. The purpose of programming a schedule for an opening and closing of the lid 160 (and how long the lid 160 should remain open or closed) would allow controlled access to the content of the bowl and would allow access control of the duration to the content of the bowl. In one example, a processor is used in the programming.

In one example, the housing 110 may include one or more camera/video system 180 with an audio system 185 attached to the housing 110. In one example, the camera/video system 180 is used for monitoring the amount of food/liquid content in the bowl 141, thus, determining when it is necessary to add food and/or water, and/or to clean the bowl. In one example, the camera/video system 180 may be coupled to a processor to activate one or more components of the automated solid/liquid dispenser.

In one example, the camera/video system 180 and audio system 185 are a composite communication system 190 which is coupled to a processor for the user to communicate, for example, its pet. For example, a pet owner can use the composite communication system 190 to view the content in the bowl 141. For example, the pet owner can use the composite communication system 190 to view the environment to view the pet. For example, the pet owner can use the composite communication system 190 to record the environment surrounding the automated solid/liquid dispenser. For example, the pet owner can use the composite communication system 190 to verbally communicate with the pet. One skilled in the art would understand that although the examples shown here relate to a pet, that examples that relate to communicates to humans are also within the spirit and scope of the present disclosure.

Figure 2:
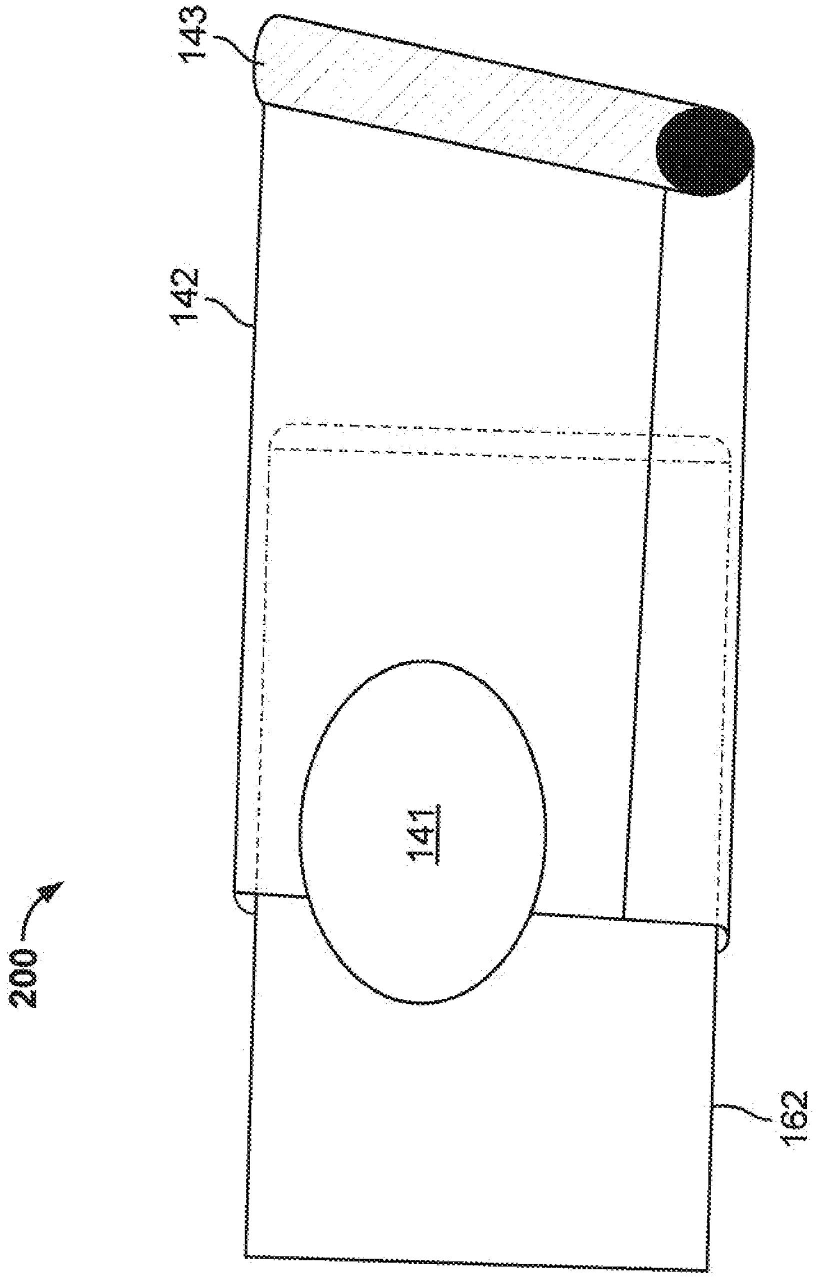
FIG. 2 illustrates an example top view of fitting the sliding floor into the lifting floor plate.

FIG. 2 illustrates an example top view 200 of fitting the sliding floor plate 162 into the lifting floor plate 142. In a first embodiment, by fitting the sliding floor plate 162 into the lifting floor plate 142, the bowl 141 is transferred to sit on the lifting floor plate 142 when the bowl 141 enters the bowl housing area 140. In the first embodiment, the dimensions of the sliding floor plate 162 are smaller than the dimensions of the lifting floor plate 142 to allow the fitting. Although the first embodiment example shows the sliding floor plate 162 fitting inside the lifting floor plate 142, in a second embodiment, the lifting floor plate 142 may fit inside the sliding floor plate 162 as the sliding floor plate 162 moves into the bowl housing area 140. In this second embodiment, the sliding floor plate 162 would have larger dimensions than the dimensions of the lifting floor plate 142.

Figure 3:
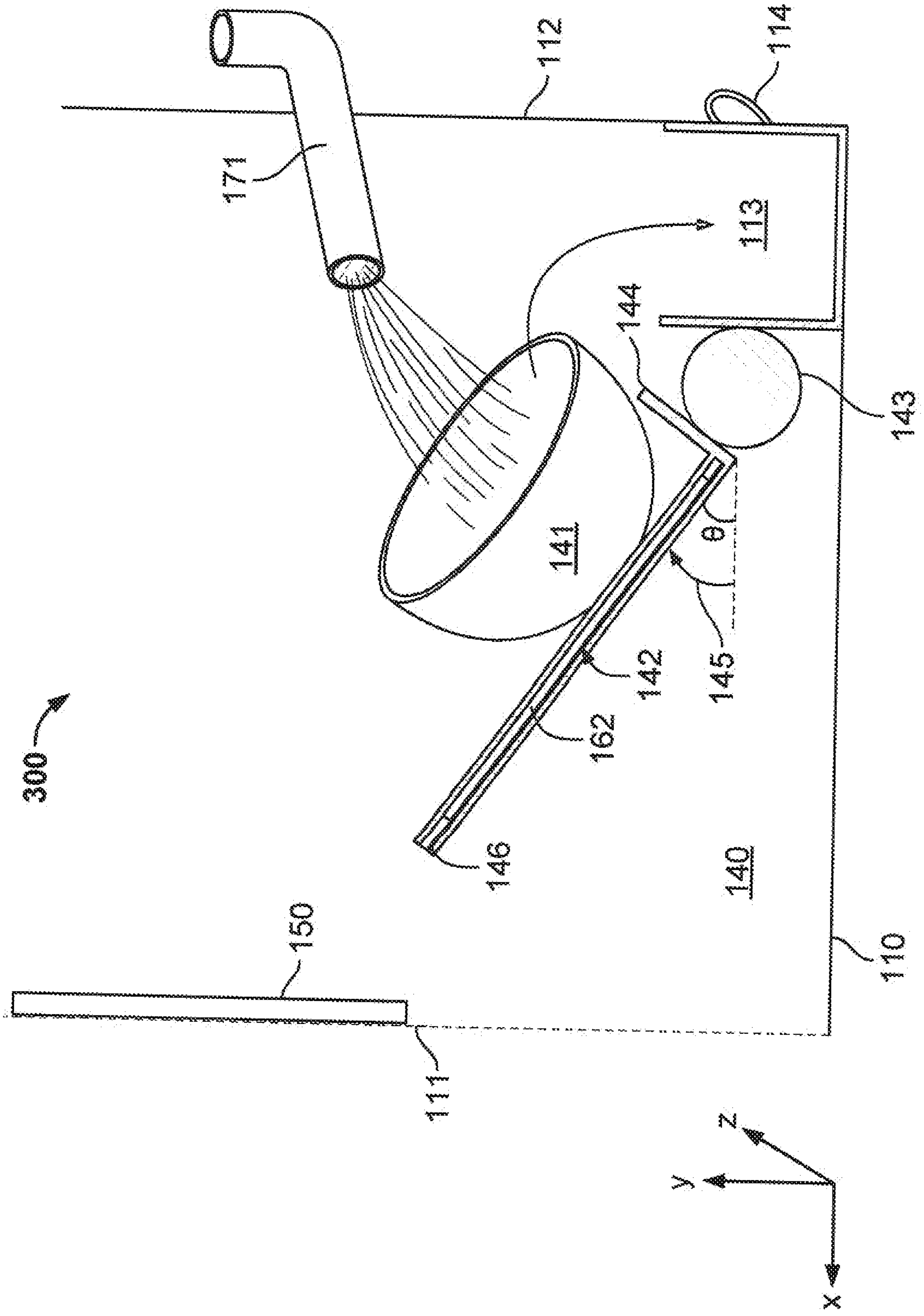
FIG. 3 illustrates an example of the water hose cleaning the bowl with the bowl tilted approximately 25-60 degrees while seated inside the bowl housing area.

In one example, a water hose 171 is connected to the housing 110 through a side 112 to reach into the bowl housing area 140. FIG. 3 illustrates an example 300 of the water hose 171 cleaning the bowl 141 with the bowl 141 tilted approximately 25-60 degrees while seated inside the bowl housing area 140. In one example, the content of the bowl 141 flows along with the water onto the bowl housing area into a trash area 113 within the bowl housing area 140 for removal by a user by the side 112. In one example, a handle 114 is included on the side 112 for usage by the user in disposing the trash content in the trash area 113.

Figure 4:
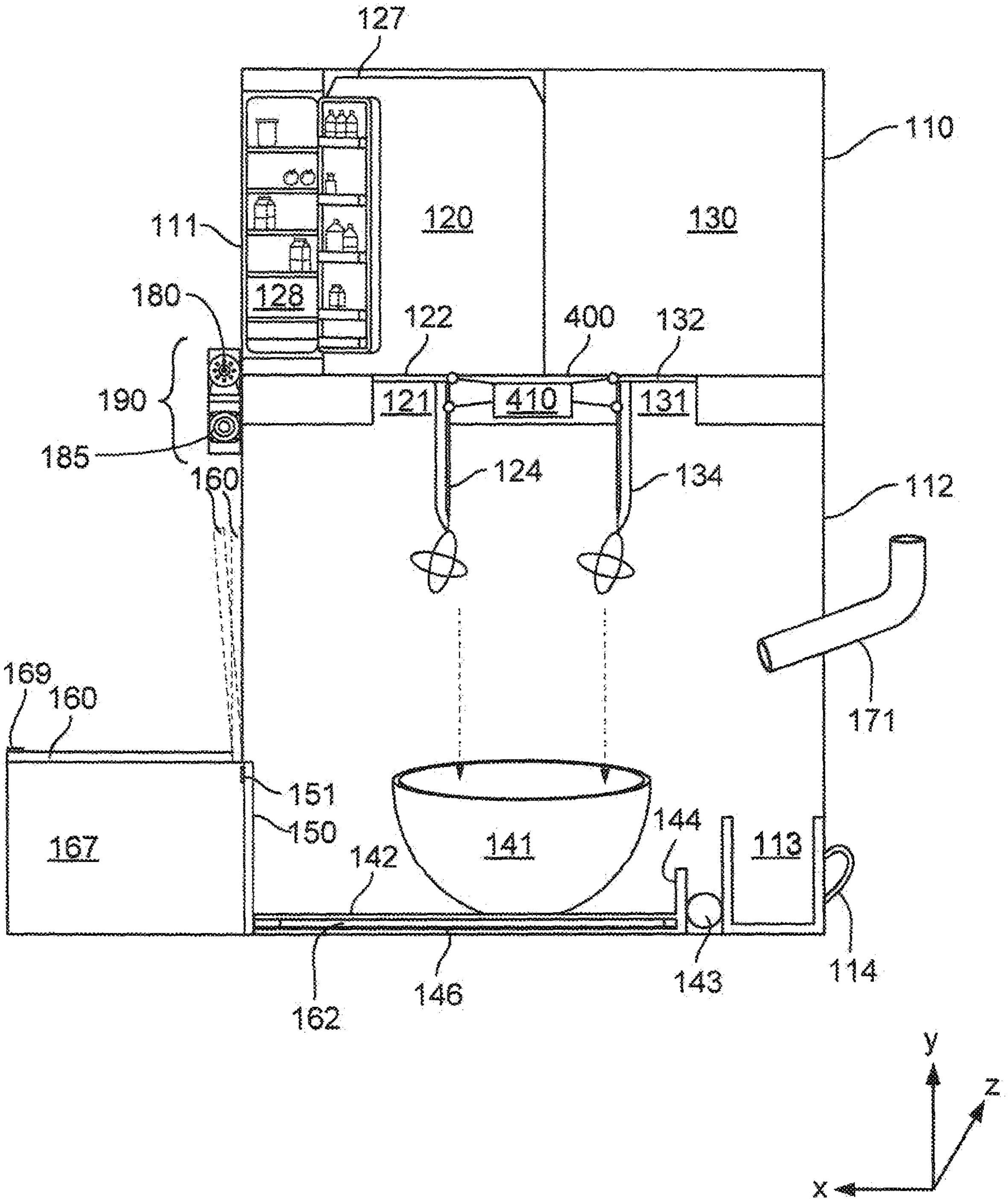
FIG. 4 illustrates an example mixer motor compartment housing a mixer motor configured to control at least two mixers.

FIG. 4 illustrates an example mixer motor compartment 400 housing a mixer motor 410 configured to control at least two mixers 124, 134. In one example, the mixer motor controls the mixers 124, 134 to descend to mix the content of the bowl 141. In one example, the mixer motor 410 also controls the covers 122, 132 to open the solid compartment 120 and/or the liquid compartment 130 to dispense solid and/or liquid content to the bowl 141. Following dispensing of solid and/or liquid content to the bowl 141, the mixer motor 410 may control the one or more mixers 124, 134 to mix the content within the bowl 141. In one example, separate motors are used to control the covers 122, 132 and mixers 124, 134. In one example, the mixer motor 410 may be programmed by a processor (not shown) housed within the housing 110.

In one example, the automated solid/liquid dispenser includes a processor configured to direct the motor that controls each of the moving parts in the dispenser. The processor may be programmed by a user wirelessly via a remote communication system (e.g., WiFi). In one example, the remote communication system may transport a plurality of activation directives to control and activate/deactivate a plurality of moving parts in the automated solid/liquid dispenser. In one example, the remote communication system may also transport video and/or audio data of the composite communication system 190. And, in one example, the processor (not shown) may be programmed remotely (for example, via mobile app) by a user.

Figure 5:
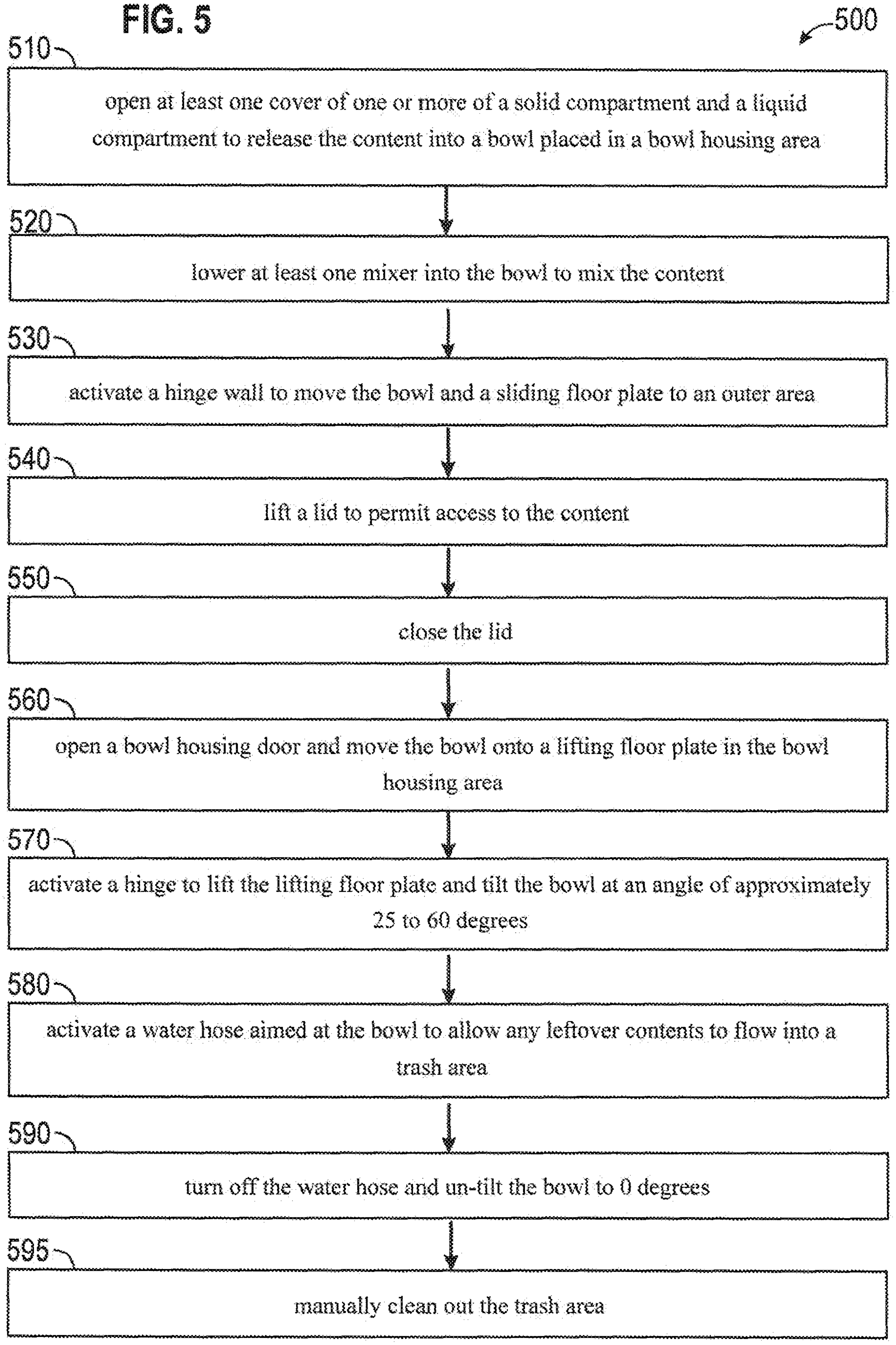
FIG. 5 illustrates an example flow diagram for automatically implementing dispensing content into a bowl and cleaning the bowl thereafter.

FIG. 5 illustrates an example flow diagram 500 for automatically implementing dispensing content into a bowl and cleaning the bowl thereafter. In block 510, open at least one cover of one or more of a solid compartment and a liquid compartment to release the content into a bowl placed in a bowl housing area. In one example, the amount of content to be released may be controlled by the amount of time the cover is open to dispense the content. For example, the time duration of the cover of the solid compartment is open or the time duration of the cover of the liquid compartment is open may be controlled by the processor which may be preprogrammed, or may be adjusted by a user.

In block 520, lower at least one mixer into the bowl to mix the content.

In block 530, activate a hinge wall to move the bowl and a sliding floor plate to an outer area.

In block 540, lift a lid to permit access to the content. In one example, a time duration the lid is open to permit access to the content may be controlled by the processor which may be preprogrammed, or may be adjusted by a user. For example, a user may desire to allow a pet access to food content for a particular time duration only and thus only allow the lid to be open for a particular time duration only.

In block 550, close the lid.

In block 560, open a bowl housing door and move the bowl onto a lifting floor plate in the bowl housing area.

In block 570, activate a hinge to lift the lifting floor plate and tilt the bowl at an angle of approximately 25 to 60 degrees.

In block 580, activate a water hose aimed at the bowl to allow any leftover contents to flow into a trash area.

In block 590, turn off the water hose and un-tilt the bowl to 0 degrees.

In block 595, manually clean out the trash area.

In one example, the disclosure discloses an apparatus including: a housing including a hinge, a trash area and at least one compartment for holding content; a bowl for receiving the content; and a lifting floor plate coupled to the hinge, wherein the bowl sits on top of the lifting floor plate, and wherein the lifting floor plate places the bowl in a tilted position towards the trash area.

In one example, the tilted position is tilted at least 45 degrees as measured relative to a horizontal plane. In one example, the apparatus further includes a water hose connected through a hole into the housing in a position to spray water onto the bowl when the bowl is in the tilted position. In one example, the trash area is separable from the housing. In one example, the trash area includes a handle.

In one example, the apparatus further includes a sliding floor plate and a lid, wherein the sliding floor plate is configured to receive the bowl with the content, and the lid is configured to open according to a timing schedule. In one example, a side of the housing includes at least one metal strip, and the lid includes an electromagnet to connect to the at least one metal strip when the lid rest along the side of the housing.

In one example, the timing schedule dictates a first time when an electromagnetic field is deactivated to cause the lid the close. In one example, the timing schedule further dictates a second time when the sliding floor plate delivers the bowl to the lifting floor plate. In one example, the timing schedule further dictates a third time when the hinge mechanically moves the lifting floor plate to achieve the tilted position. In one example, the timing schedule is a timer or a clock.

In one example, the apparatus further includes a water hose connected through a hole into the housing in a position to spray water onto the bowl when the bowl is in the tilted position. In one example, the tilted position is tilted between 45-60 degrees as measured relative to a horizontal plane. In one example, the trash area is separable from the housing. In one example, the trash area includes a handle.

In one example, the apparatus further includes a refrigerator coupled to the at least one compartment, wherein the refrigerator is configured to keep the temperature of the content below room temperature. In one example, the housing includes at least two compartments for containing at least two types of contents. In one example, the apparatus further includes a motor and a mixer, wherein the motor is coupled to the mixer and the mixer is configured to mix the at least two types of contents. In one example, the apparatus further includes a camera/video system for visual monitoring, and an audio system for verbal communication. In one example, the apparatus further includes a volume sensor configured to measure the volume of the content. In one example, the apparatus further includes a refrigerator coupled to the at least one compartment, wherein the refrigerator is configured to keep the temperature of the content below room temperature.

Figure 6:
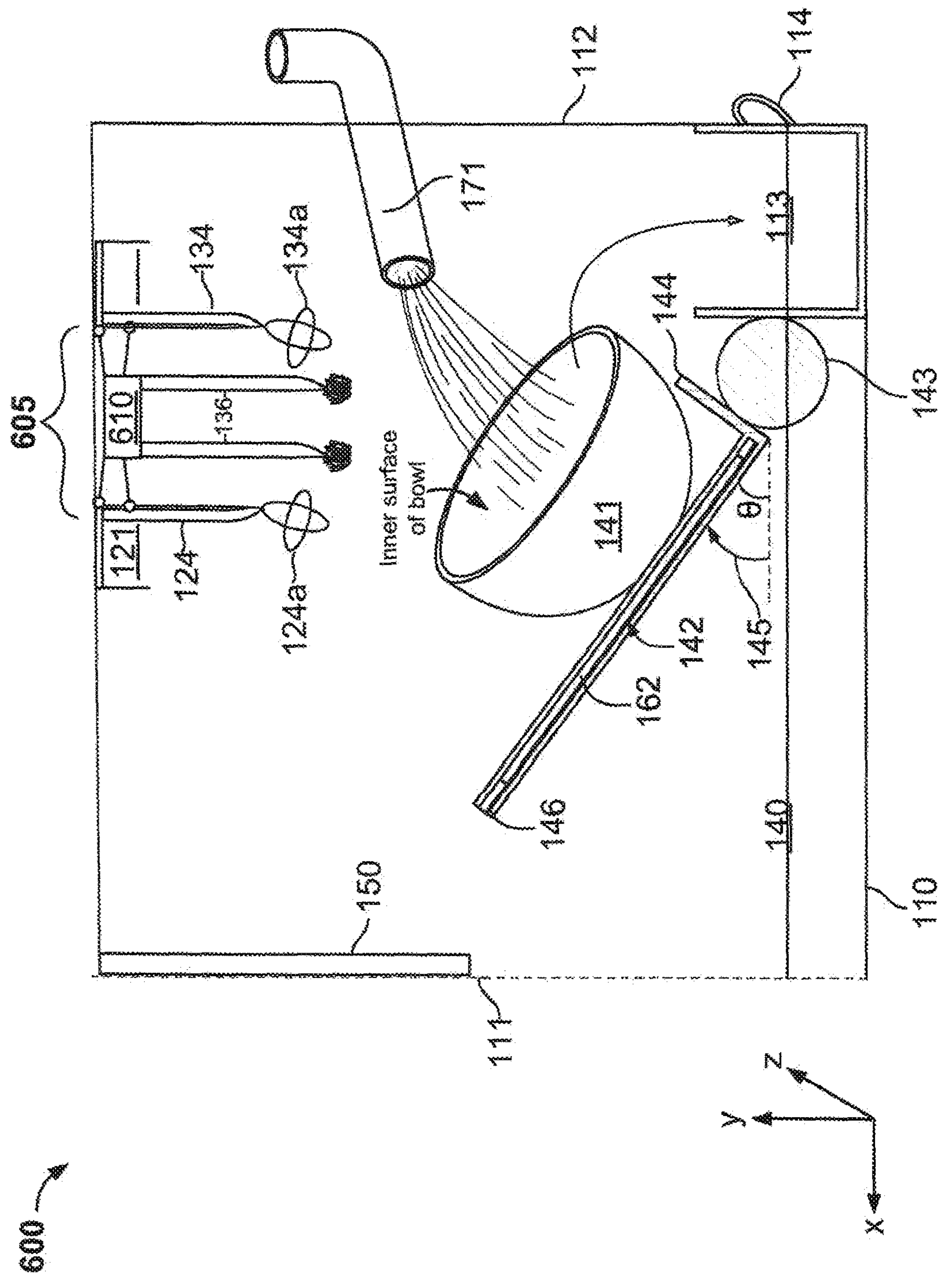
FIG. 6 illustrates an example of a cleaning compartment including a cleaning housing.

FIG. 6 illustrates an example of a cleaning compartment 600 including a cleaning housing 605. As shown in FIG. 6, the cleaning housing includes a set of cleaning brushes 136 and a motor 610 configured to control the set of cleaning brushes 136, such as to make it rotate to clean the bowl 141. One skilled in the art would understand that although a pair of cleaning brushes is shown in FIG. 6, that any quantity of cleaning brushes may be used, for example, one brush may suffice, or more than two brushes may be needed, depending on the size of the bowl or the type of cleaning needed. Additionally, in one example, the motor 610 that controls the cleaning brush or brushes could be the same motor 410 (shown in FIG. 4) that controls the mixers 124, 134. That is, a single motor could control both the mixer 124, 134 and the cleaning brushes 136.

In one example, the mixers 124, 134 may be used to clean the bowl 141. Depending on the mixer head 124*a*, 134*a*, the mixers 124, 134 may be suitable not only for mixing the contents of the bowl, but also for cleaning the bowl. Thus, in one example, the mixers 124, 134 are also cleaning tools. And, in another example, the mixers 124, 134 along with the cleaning brush(es) 136 are controlled by the motor 610 to clean the bowl using water from the water hose 171. In one aspect, the mixers 124, 134 and the cleaning brush(es) 136 may function as cleaning tools (i.e., cleaning tool for the bowl 141).

In one example, when the lifting floor plate 142 is lifted to form an angle of approximately 25 to 60 degrees theta θ between the x-axis and the y-axis (e.g., with an empty (or near empty) bowl 141) sitting on top of the lifting floor plate 142), the motor 610 is configured to lower at least one cleaning tool (i.e., lower one or more mixers 124, 134, and/or cleaning brush(es)) to clean contact inner surface of the bowl 141 to scrub the inner surface of the bowl 141 as the bowl 141 receives the spray water from the water hose 171 (shown in FIG. 1).

In one example, the mixer head 124*a*, 134*a* are made of materials (preferably non-stick materials) such as, but not limited to, silicone, plastic, metal (e.g., stainless steel, cast iron) and other materials that are typically used on cookware and cookware utensils, but are also durable enough to be used for scrubbing/cleaning.

In one example, the motor 610 may be remotely controlled and/or programmed by a user similarly to the way the motor 410 is remotely controlled and/or programmed by a user, for example, via WiFi, available wireless technology, etc.

an apparatus including: a housing including a hinge, a trash area and at least one compartment for holding content; a bowl for receiving the content; a lifting floor plate coupled to the hinge, wherein the bowl sits on top of the lifting floor plate; a water hose connected through a hole into the housing in a position to spray water onto the bowl when the bowl is placed in a tilted position by the lifting floor plate; and motor configured to lower at least one cleaning tool to an inner surface of the bowl to scrub the inner surface of the bowl as the bowl receives the spray water from the water hose.

In one example, the tilted position is tilted at least 45 degrees as measured relative to a horizontal plane. In one example, the apparatus further includes a refrigerator, wherein the refrigerator is coupled physically to the housing but functions independently. In one example, the trash area is separable from the housing. In one example, the trash area includes a handle.

In one example, the apparatus further includes a sliding floor plate and a lid, wherein the sliding floor plate is configured to receive the bowl with the content, and the lid is configured to open according to a timing schedule. In one example, a side of the housing includes at least one metal strip, and the lid includes an electromagnet to connect to the at least one metal strip when the lid rests along the side of the housing. In one example, the timing schedule dictates a first time when an electromagnetic field is deactivated to cause the lid to close. In one example, the timing schedule further dictates a second time when the sliding floor plate delivers the bowl to the lifting floor plate. In one example, the timing schedule further dictates a third time when the hinge mechanically moves the lifting floor plate to achieve the tilted position.

In one example, the apparatus further includes a sensor configured to measure the weight of the content. In one example, the tilted position is tilted between 45-60 degrees as measured relative to a horizontal plane. In one example, the trash area is separable from the housing. In one example, the trash area includes a handle.

In one example, the apparatus further includes a refrigerator coupled to the at least one compartment, wherein the refrigerator is configured to keep the temperature of the content below room temperature. In one example, the housing includes at least two compartments for containing at least two types of contents. In one example, the apparatus further includes a mixer, wherein the mixer is coupled to the motor and the motor is configured to cause the mixer to mix the content. In one example, the apparatus further includes a camera/video system for visual monitoring, and an audio system for verbal communication.

In one aspect, one or more of the steps for providing automated solid/liquid dispenser in FIG. 5 may be executed by one or more processors which may include hardware, software, firmware, etc. The one or more processors, for example, may be used to execute software or firmware needed to perform the steps in the flow diagram of FIG. 5. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may reside in a processing system, external to the processing system, or distributed across multiple entities including the processing system. The computer-readable medium may be embodied in a computer program product. By way of example, a computer program product may include a computer-readable medium in packaging materials. The computer-readable medium may include software or firmware. Those skilled in the art will recognize how best to implement the described functionality presented throughout this disclosure depending on the particular application and the overall design constraints imposed on the overall system.

Any circuitry included in the processor(s) is merely provided as an example, and other means for carrying out the described functions may be included within various aspects of the present disclosure, including but not limited to the instructions stored in the computer-readable medium, or any other suitable apparatus or means described herein, and utilizing, for example, the processes and/or algorithms described herein in relation to the example flow diagram.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

One skilled in the art would understand that various features of different embodiments may be combined or modified and still be within the spirit and scope of the present disclosure.

What is claimed is:

1. An apparatus comprising:

a housing including a hinge, a trash area and at least one compartment for holding content;

a bowl for receiving the content;

a lifting floor plate coupled to the hinge, wherein the bowl sits on top of the lifting floor plate;

a water hose connected through a hole into the housing in a position to spray water onto the bowl when the bowl is placed in a tilted position by the lifting floor plate; and a motor configured to lower at least one cleaning tool to an inner surface of the bowl to scrub the inner surface of the bowl as the bowl receives the spray water from the water hose.

2. The apparatus of claim 1, wherein the tilted position is tilted at least 45 degrees as measured relative to a horizontal plane.

3. The apparatus of claim 1, further comprising a refrigerator, wherein the refrigerator is coupled physically to the housing but functions independently.

4. The apparatus of claim 1, wherein the trash area is separable from the housing.

5. The apparatus of claim 4, wherein the trash area includes a handle.

6. The apparatus of claim 1, further comprising a sliding floor plate and a lid, wherein the sliding floor plate is configured to receive the bowl with the content, and the lid is configured to open according to a timing schedule.

7. The apparatus of claim 6, wherein a side of the housing includes at least one metal strip, and the lid includes an electromagnet to connect to the at least one metal strip when the lid rests along the side of the housing.

8. The apparatus of claim 7, wherein the timing schedule dictates a first time when an electromagnetic field is deactivated to cause the lid to close.

9. The apparatus of claim 8, wherein the timing schedule further dictates a second time when the sliding floor plate delivers the bowl to the lifting floor plate.

10. The apparatus of claim 9, wherein the timing schedule further dictates a third time when the hinge mechanically moves the lifting floor plate to achieve the tilted position.

11. The apparatus of claim 1, further comprising a sensor configured to measure weight of the content.

12. The apparatus of claim 1, wherein the tilted position is tilted between 45-60 degrees as measured relative to a horizontal plane.

13. The apparatus of claim 12, wherein the trash area is separable from the housing.

14. The apparatus of claim 13, wherein the trash area includes a handle.

15. The apparatus of claim 1, further comprising a refrigerator coupled to the at least one compartment, wherein the refrigerator is configured to keep temperature of the content below room temperature.

16. The apparatus of claim 15, wherein the housing includes at least two compartments for containing at least two types of contents.

17. The apparatus of claim 1, further comprising a mixer, wherein the mixer is coupled to the motor and the motor is configured to cause the mixer to mix the content.

18. The apparatus of claim 1, further comprising a camera/video system for visual monitoring, and an audio system for verbal communication.

* * * * *